US008766558B2

(12) United States Patent
Kitagawa

(10) Patent No.: US 8,766,558 B2
(45) Date of Patent: Jul. 1, 2014

(54) SEMICONDUCTOR LIGHT SOURCE LIGHTING CIRCUIT

(75) Inventor: Takayoshi Kitagawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 186 days.

(21) Appl. No.: 13/533,109

(22) Filed: Jun. 26, 2012

(65) Prior Publication Data

US 2012/0326632 A1 Dec. 27, 2012

(30) Foreign Application Priority Data

Jun. 27, 2011 (JP) ................................ 2011-141546

(51) Int. Cl.

| | |
|---|---|
| ***G05F 1/00*** | (2006.01) |
| ***H05B 37/02*** | (2006.01) |
| ***H05B 39/04*** | (2006.01) |
| ***H05B 41/36*** | (2006.01) |
| *B60Q 1/14* | (2006.01) |
| *H05B 39/02* | (2006.01) |

(52) U.S. Cl.
USPC ........... 315/297; 315/77; 315/209 R; 315/307

(58) Field of Classification Search
None
See application file for complete search history.

(56) References Cited

U.S. PATENT DOCUMENTS

| | | | | |
|---|---|---|---|---|
| 2005/0200312 | A1* | 9/2005 | Komiya et al. | ............... 315/291 |
| 2009/0184663 | A1 | 7/2009 | Reinle | |
| 2010/0327835 | A1 | 12/2010 | Archibald | |
| 2011/0140621 | A1 | 6/2011 | Yi et al. | |

FOREIGN PATENT DOCUMENTS

| | | |
|---|---|---|
| JP | 2010-098836 | 4/2010 |
| WO | 2008/017467 | 2/2008 |

OTHER PUBLICATIONS

European Patent Office, official communication, European Search Report for European Patent Application No. 12173595.5 (dated Oct. 17, 2012).

* cited by examiner

*Primary Examiner* — Douglas W Owens
*Assistant Examiner* — Dedei K Hammond
(74) *Attorney, Agent, or Firm* — Fish & Richardson P.C.

(57) ABSTRACT

A lighting circuit for lighting a semiconductor light source includes: a DC/DC converter configured to receive a DC first voltage and a DC second voltage and generate a DC third voltage; a first connector including a first terminal, wherein the third voltage is applied to the first terminal, wherein the first connector connects the first terminal and one end of the semiconductor light source; and a control circuit that controls the DC/DC converter. The control circuit selects only the first voltage as a voltage applied to the other end of the semiconductor light source, when a voltage for emitting the semiconductor light source is less than an absolute value of a difference between the first and second voltages. The control circuit selects the first voltage or the second voltage as the voltage applied to the other end thereof, when the voltage is not less than the absolute value.

4 Claims, 5 Drawing Sheets

SEMICONDUCTOR LIGHT SOURCE LIGHTING CIRCUIT

This application claims priority from Japanese Patent Application No. 2011-141546, filed on Jun. 27, 2011, the entire contents of which are hereby incorporated by reference.

BACKGROUND

1. Technical Field

The present disclosure relates to a semiconductor light source lighting circuit.

2. Related Art

In recent years, an LED, which has a relatively long life and low power consumption, has been used in a vehicle lamp such as a headlight instead of a halogen lamp, which includes filaments. The degree of light emission of an LED, that is, the brightness of an LED, depends on the magnitude of flowing current. Accordingly, a lighting circuit, which adjusts current flowing in an LED, is needed when the LED is used as a light source.

When a plurality of LEDs connected in series are to be lit, the decision whether to step up or step down a battery voltage in the lighting circuit is made according to the magnitude relationship between the battery voltage and the sum of forward-drop voltages of the LEDs. If dedicated lighting circuits should be designed for each of the respective cases, the variation of the lighting circuit is increased and manufacturing costs could increase.

Accordingly, a step-up/step-down DC/DC converter, which can cope with a forward drop voltage over a wide range, has been proposed (see Japanese Patent Document No. JP-A-2010-98836).

However, if the step-up/step-down DC/DC converter is used when the sum of forward drop voltages of the LEDs is higher than the battery voltage, it is disadvantageous in terms of the efficiency of divided electricity, which has a function of stepping a voltage down, as compared to a case where a step-up DC/DC converter is used.

SUMMARY OF THE DISCLOSURE

Some implementations of the present invention may address the foregoing issue as well as other issues. However, the present invention is not required to overcome the disadvantages described above and thus, some implementations of the present invention may not overcome these disadvantages.

In one aspect, the present disclosure describes a semiconductor light source lighting circuit having high electrical efficiency and capable of allowing a semiconductor light source to emit light over a wide range of a light emission voltage.

According to one or more aspects, a lighting circuit (100, 200, 300) for lighting a semiconductor light source (4) is described. The circuit includes: a DC/DC converter configured to receive a DC first voltage ($V_{bat}$) and a DC second voltage different from the first voltage so as to generate a DC third voltage ($V_{boost}$) such that a difference between the third and second voltages is more than a difference between the first and second voltages. The circuit includes a first connector comprising a first terminal (Boost), wherein the third voltage ($V_{boost}$) is applied to the first terminal, and the first connector is configured to connect the first terminal and one end of the semiconductor light source. A control circuit is configured to control the DC/DC converter such that a value of current flowing between the DC/DC converter and the first terminal is set to a certain value. The control circuit is configured to select only the first voltage ($V_{bat}$) as a voltage applied to the other end of the semiconductor light source, when a light emission voltage ($V_F$) for emitting the semiconductor light source is less than an absolute value of the difference between the first and second voltages. The control circuit is configured to select the first voltage or the second voltage as the voltage applied to the other end of the semiconductor light source, when the light emission voltage is not less than the absolute value.

Other aspects, features and advantages of the present invention will be apparent from the following description, the drawings and the claims.

DETAILED DESCRIPTION

Figure 1:
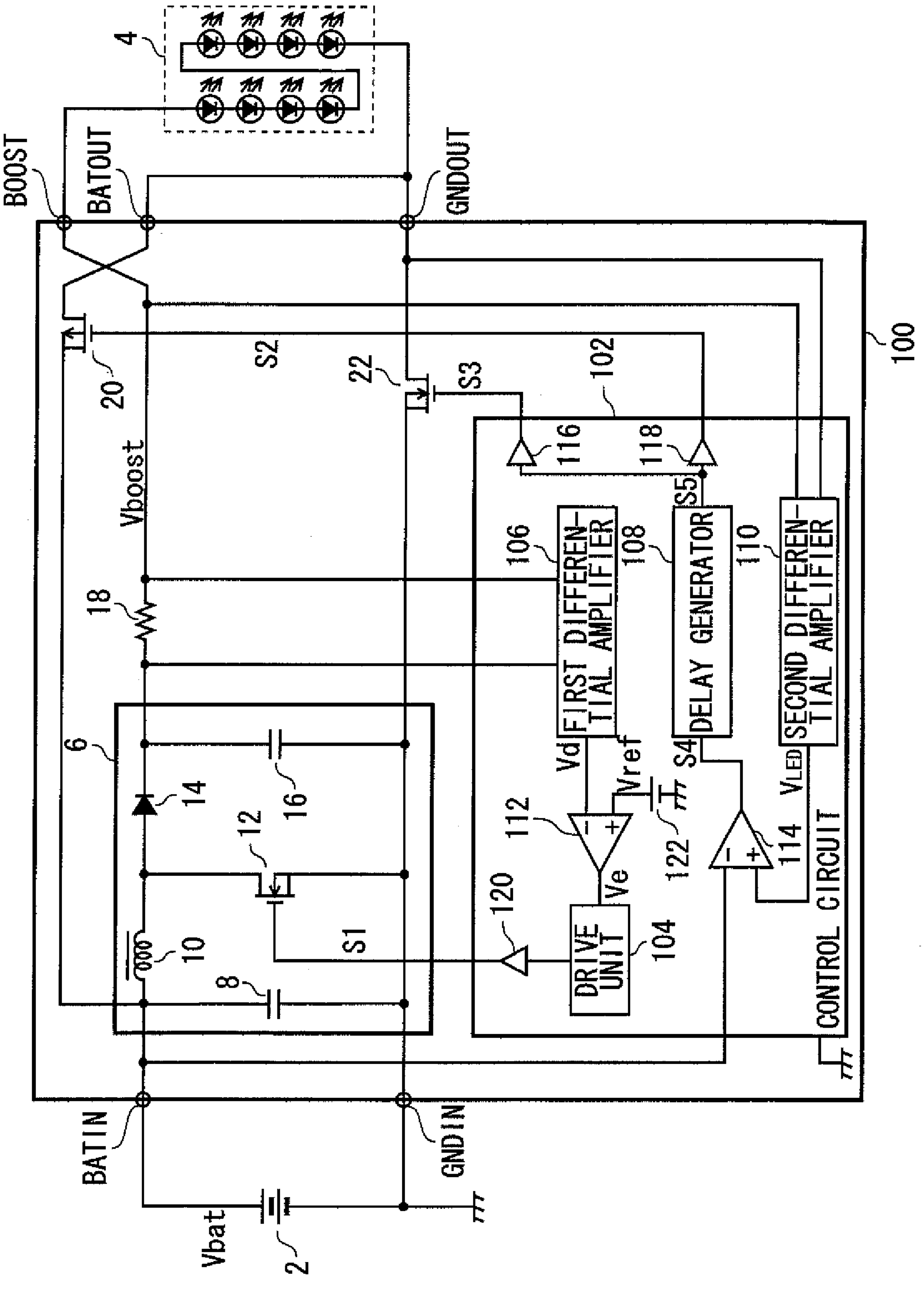
FIG. 1 is a circuit diagram showing the configuration of a semiconductor light source lighting circuit according to a first embodiment, and an in-vehicle battery and an LED connected to the light source lighting circuit.

Hereinafter, the same or equivalent components, members, and signals, which are shown in the respective drawings, are denoted by the same reference numerals, and the repeated description thereof will be appropriately omitted. Further, some of members, which are not important in the description, will be omitted in the respective drawings.

(First Embodiment)

A semiconductor light source lighting circuit according to a first embodiment drives an LED that is a light source of a vehicle lamp such as a headlight. The semiconductor light source lighting circuit applies an output voltage of a DC/DC converter to an anode of the LED. The semiconductor light source lighting circuit switches a voltage, which is applied to a cathode of the LED, between a battery voltage and a ground potential, which is a reference potential, according to the magnitude relationship between a battery voltage of an in-vehicle battery and a forward drop voltage of the LED, that is, a light emission voltage that is required to make the LED emit light. Accordingly, it is possible to drive the LED even when the forward drop voltage is lower than the battery voltage, and it is possible further to improve electrical efficiency in driving the LED when the forward drop voltage is not lower than the battery voltage.

FIG. 1 is a circuit diagram showing the configuration of a semiconductor light source lighting circuit 100 according to a first embodiment, and an in-vehicle battery 2 and an LED 4 connected to the light source lighting circuit 100. In the illustrated example, the semiconductor light source lighting circuit 100 includes a DC/DC converter 6, a current detecting resistor 18, a second switching element 20, a third switching element 22, a control circuit 102, a battery voltage input terminal BATIN, a battery voltage output terminal BATOUT, a ground potential input terminal GNDIN, a ground potential output terminal GNDOUT, and a boost voltage output terminal BOOST. The battery voltage input terminal BATIN is connected to a positive terminal of the in-vehicle battery 2, and a battery voltage $V_{bat}$ is applied to the battery voltage input terminal BATIN. A negative terminal of the in-vehicle battery 2 and the ground potential input terminal GNDIN are grounded, and a ground potential is applied to the ground potential input terminal GNDIN.

The LED 4 is formed of eight in-vehicle LEDs that are connected in series. A forward drop voltage $V_F$ of the LED 4 is the sum of forward drop voltages of the eight in-vehicle LEDs. Current flowing in the LED 4 is referred to as LED current. The semiconductor light source lighting circuit 100 and the LED 4 are mounted on a vehicle lamp.

The DC/DC converter 6 is a step-up/non-isolated switching regulator that receives the DC battery voltage $V_{bat}$ and the DC ground potential different from each other and generates a DC boost voltage $V_{boost}$ by converting the battery voltage $V_{bat}$ so that a difference between the ground potential and the battery voltage $V_{bat}$ is increased. The DC/DC converter 6 includes a first capacitor 8, an inductor 10, a first switching element 12, a diode 14 and a second capacitor 16.

One end of the first capacitor 8 and one end of the inductor 10 are connected to the battery voltage input terminal BATIN. The other end of the first capacitor 8 is grounded by being connected to the ground potential input terminal GNDIN. The first switching element 12 is composed, for example, of an N-channel MOSFET (Metal Oxide Semiconductor Field Effect Transistor). The other end of the inductor 10 is connected to the anode of the diode 14 and the drain of the first switching element 12. The source of the first switching element 12 is grounded. The cathode of the diode 14 is connected to one end of the second capacitor 16 and is connected to one end of the current detecting resistor 18. The other end of the second capacitor 16 is grounded. The gate of the first switching element 12 receives a pulse-width modulated PWM (Pulse Width Modulation) signal S1 from the control circuit 102. The PWM signal S1 is a signal used to control the LED current that is output to the LED 4 from the DC/DC converter 6.

The other end of the current detecting resistor 18 is connected to the boost voltage output terminal BOOST. A resistance value of the current detecting resistor 18 is small, and the voltage drop, which is caused by the LED current flowing in the current detecting resistor 18, can be detected. However, hereinafter, it is assumed that the voltage drop is negligible compared to the boost voltage $V_{boost}$. Accordingly, the boost voltage $V_{boost}$ is applied to the boost voltage output terminal BOOST.

The second switching element 20 and the third switching element 22 are a P-channel MOSFET and an N-channel MOSFET, respectively. Sources of the second and third switching elements 20 and 22 are connected to the battery voltage input terminal BATIN and the ground potential input terminal GNDIN, respectively. Drains of the second and third switching elements 20 and 22 are connected to the battery voltage output terminal BATOUT and the ground potential output terminal GNDOUT, respectively. The second and third switching elements 20 and 22 are controlled by a battery input control signal S2 and a ground input control signal S3 that are input to gates thereof from the control circuit 102, respectively.

The boost voltage output terminal BOOST, the battery voltage output terminal BATOUT, and the ground potential output terminal GNDOUT form one three-terminal circuit-side connector. When the three-terminal circuit-side connector is engaged with a corresponding LED-side connector of the LED 4, the boost voltage output terminal BOOST is connected to the anode side of the LED 4, and the battery voltage output terminal BATOUT and the ground potential output terminal GNDOUT are connected to the cathode side of the LED 4. Accordingly, the boost voltage $V_{boost}$ output from the DC/DC converter 6 is applied to the anode side of the LED 4.

The control circuit 102 controls the DC/DC converter 6 so that current flowing between the DC/DC converter 6 and the boost voltage output terminal BOOST, that is, the LED current has a desired value. Further, when the forward drop voltage $V_F$ of the LED 4 is lower than the battery voltage $V_{bat}$ (i.e., $V_F<V_{bat}$), the control circuit 102 selects the battery voltage $V_{bat}$ as a voltage to be applied to the cathode side of the LED 4. When the battery voltage $V_{bat}$ is not selected, the control circuit 102 selects the ground potential as a voltage to be applied to the cathode side of the LED 4. An example in which the battery voltage $V_{bat}$ is not selected may be a situation in which the forward drop voltage $V_F$ of the LED 4 is equal to or higher than the battery voltage $V_{bat}$ (i.e., $V_F>V_{bat}$).

Accordingly, the battery voltage $V_{bat}$ is applied to the cathode side of the LED 4 if $V_F<V_{bat}$, and the ground potential is applied to the cathode side of the LED 4 if $V_F \geq V_{bat}$.

In the illustrated example, the control circuit 102 includes a drive unit 104, a first differential amplifier 106, a delay generator 108, a second differential amplifier 110, an error amplifier 112, a comparator 114, a first buffer 116, a second buffer 118, a third buffer 120, and a reference voltage source 122.

The first differential amplifier 106 generates a detection voltage $V_d$, which corresponds to the magnitude of a voltage drop of the current detecting resistor 18, that is, LED current, by amplifying a difference between a voltage at one end of the current detecting resistor 18 and a voltage at the other end of the current detecting resistor 18. The first differential amplifier 106 applies the generated detection voltage $V_d$ to an inverting input terminal of the error amplifier 112.

The reference voltage source 122 generates a reference voltage $V_{ref}$ corresponding to a target value of the magnitude of the LED current, and applies the reference voltage $V_{ref}$ to a non-inverting input terminal of the error amplifier 112.

The error amplifier 112 compares the detection voltage $V_d$ and the reference voltage $V_{ref}$. That is, the error amplifier 112 compares the magnitude of the LED current, which is indicated by the detection voltage $V_d$, with a target value that is indicated by the reference voltage $V_{ref}$. The error amplifier 112 generates an error voltage $V_e$ that corresponds to a difference between a target value and the magnitude of the LED current, and outputs the error voltage $V_e$ to the drive unit 104.

The drive unit 104 controls an on/off duty ratio of the first switching element 12 on the basis of the error voltage V. The drive unit 104 generates the PWM signal S1 and outputs the PWM signal S1 to the gate of the first switching element 12 through the third buffer 120. The drive unit 104 sets a duty ratio of the PWM signal S1 according to the error voltage $V_e$ so that the magnitude of the LED current approaches a target value.

The second differential amplifier 110 generates a difference between a voltage applied to the boost voltage output terminal BOOST and a voltage applied to the ground potential output terminal GNDOUT, as an LED voltage $V_{LED}$. The LED voltage $V_{LED}$ is a voltage across the LED 4. When the LED 4 usual emits light, the value of the LED voltage $V_{LED}$ is the same as the value of the forward drop voltage $V_F$ of the LED 4. The second differential amplifier 110 applies the generated LED voltage $V_{LED}$ to a non-inverting input terminal of the comparator 114.

The battery voltage $V_{bat}$ is applied to an inverting input terminal of the comparator 114. The comparator 114 generates a switching signal S4. When the battery voltage $V_{bat}$ is higher than the LED voltage $V_{LED}$, the switching signal S4 is negated, that is, set to a low level. When the battery voltage $V_{bat}$ is not higher than the LED voltage $V_{LED}$, the switching signal S4 is asserted, that is, set to a high level.

The delay generator 108 prevents the control circuit 102 from selecting a voltage to be applied to the cathode side of the LED 4 until a predetermined delay period passes after power is supplied to the semiconductor light source lighting circuit 100. In the delay period, the delay generator 108 maintains a state where the battery voltage $V_{bat}$ is applied to the cathode side of the LED 4.

The delay generator 108 is fixed at a low level until the delay period passes after power is supplied to the semiconductor light source lighting circuit 100. After that, the delay generator 108 generates a delay switching signal S5 that is equivalent to the switching signal S4. The delay switching signal S5 corresponds to a signal that is obtained by masking the switching signal S4 at a low level during the delay period. The delay generator 108 outputs the generated delay switching signal S5 to the gates of the third and second switching elements 22 and 20 through the first and second buffers 116 and 118, respectively.

Operation of the semiconductor light source lighting circuit 100 having the foregoing configuration is described next.

Figure 2:
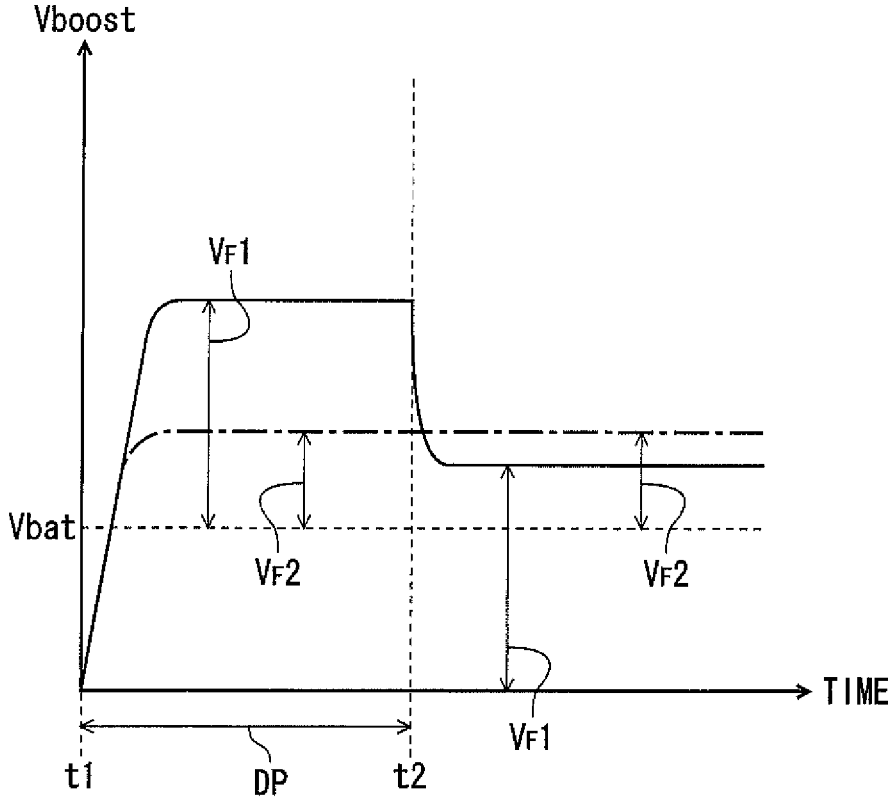
FIG. 2 is a graph showing a change over time of a boost voltage when a forward drop voltage is lower than a battery voltage and when a forward drop voltage is equal to or higher than a battery voltage.

FIG. 2 is a graph showing a change over time of the boost voltage $V_{boost}$ in the respective cases of $V_F<V_{bat}$ and $V_F \geq V_{bat}$. The solid line of FIG. 2 represents the change over time of the boost voltage $V_{boost}$ when $V_F \geq V_{bat}$, and the dashed-dotted line of FIG. 2 represents a change over time of the boost voltage $V_{boost}$ when $V_F<V_{bat}$.

The battery voltage $V_{bat}$ is applied to the battery voltage input terminal BATIN at a time t1, so that power is supplied to the semiconductor light source lighting circuit 100. Since the delay switching signal S5 is fixed at a low level during a delay period DP of which a starting point is the time t1, the second switching element 20 is in a conducting state and the third switching element 22 is in a non-conducting state. Accordingly, the battery voltage $V_{bat}$ is applied to the cathode side of the LED 4.

The boost voltage $V_{boost}$ starting to rise at the time t1 is stabilized near a value, which is obtained by adding the forward drop voltage $V_F$ of the LED 4 to the battery voltage $V_{bat}$, when the LED 4 emits light. Hereinafter, the forward drop voltage $V_F$, when $V_F \geq V_{bat}$, is referred to as a first forward drop voltage $V_{F1}$, and the forward drop voltage $V_F$, when $V_F<V_{bat}$, is referred to as a second forward drop voltage $V_{F2}$. When $V_F \geq V_{bat}$, a stabilized value of the boost voltage $V_{boost}$ is a voltage that is obtained by adding the first forward drop voltage $V_{F1}$ to the battery voltage $V_{bat}$. When $V_F<V_{bat}$, a stabilized value of the boost voltage $V_{boost}$ is a voltage that is obtained by adding the second forward drop voltage $V_{F2}$ to the battery voltage $V_{bat}$.

When $V_F \geq V_{bat}$, at a time t2 when the delay period DP has passed from the time t1, the delay switching signal S5 is turned to a high level, the second switching element 20 is in a non-conducting state, and the third switching element 22 is in a conducting state. Accordingly, the ground potential is applied to the cathode side of the LED 4. Then, the boost voltage $V_{boost}$ drops to the vicinity of the first forward drop voltage $V_{F1}$ and is stabilized.

Meanwhile, a dead time may be provided when the voltage applied to the cathode side of the LED 4 is switched.

When $V_F<V_{bat}$, the delay switching signal S5 is maintained at a low level even after the time t2. Accordingly, the battery voltage $V_{bat}$ is applied to the cathode side of the LED 4.

According to some implementations of the semiconductor light source lighting circuit 100, it is possible to use the same semiconductor light source lighting circuit 100, particularly, the same step-up DC/DC converter 6 in any one of the situations, i.e., $V_F<V_{bat}$ and $V_F \geq V_{bat}$. Accordingly, since different semiconductor light source lighting circuits or DC/DC converters do not need to be used depending on, for example, the number or specifications of LEDs and a value of the battery voltage, it is possible to reduce manufacturing costs.

Further, in some implementations, the semiconductor light source lighting circuit 100 performs driving of the LED 4, which is caused by a drop in voltage, by applying the battery voltage $V_{bat}$ to the cathode side of the LED 4 if $V_F<V_{bat}$ and switches the voltage, which is applied to the cathode side of the LED 4, to the ground potential if $V_F \geq V_{bat}$. Accordingly, it is possible to make the boost voltage at the time of usual lighting lower compared to the case in which the battery voltage $V_{bat}$ is steadily applied to the cathode side of the LED 4 without the above-mentioned switching function. Therefore, it is possible further to improve the electrical efficiency of the semiconductor light source lighting circuit 100 at the time of usual lighting. As a result, the amount of heat generated can be reduced, and it is possible to use elements that are more compact and inexpensive.

Furthermore, the voltage applied to the cathode side of the LED 4 can be switched automatically in the semiconductor light source lighting circuit 100 according to this embodiment. Accordingly, even though the forward drop voltage $V_F$ of the LED 4 fluctuates as a result of the variation in temperature material characteristics of the LED, it is possible to select an optimum driving state adaptively. The same also applies to fluctuations of the battery voltage $V_{bat}$.

Moreover, a delay period can be provided after the supply of power and an operation for selecting a voltage, which is to be applied to the cathode side of the LED 4, is stopped during the delay period. Accordingly, it is possible to prevent the voltage, which is applied to the cathode side of the LED 4, from being switched until the boost voltage $V_{boost}$ rises and is sufficiently stabilized. As a result, since the determination of whether or not to switch a voltage is made through comparison on the basis of the sufficiently stabilized boost voltage $V_{boost}$, it is possible to improve the reliability of the determination. Further, even when a voltage is to be switched, it is possible to more smoothly switch the voltage since the DC/DC converter 6 is stabilized sufficiently after the delay period.

Furthermore, the battery voltage $V_{bat}$ can be applied to the cathode side of the LED 4 during the delay period. Accordingly, it is possible to prevent a voltage, which significantly exceeds the forward drop voltage $V_F$, from being applied to the LED 4 during the delay period when $V_F<V_{bat}$.

(Second Embodiment)

In the first embodiment described above, control circuit 102 automatically switches a voltage to be applied to the cathode side of the LED 4 on the basis of the magnitude relationship between the forward drop voltage $V_F$ of the LED 4 and the battery voltage $V_{bat}$. According to a second embodiment, an LED-side connector corresponding to a three-terminal circuit-side connector 250 of the semiconductor light source lighting circuit 200 includes two terminals, and a corresponding relationship between the two terminals and three terminals of the circuit is then decided on the basis of the magnitude relationship between a known forward-drop voltage $V_F$ and a battery voltage $V_{bat}$.

Figure 3:
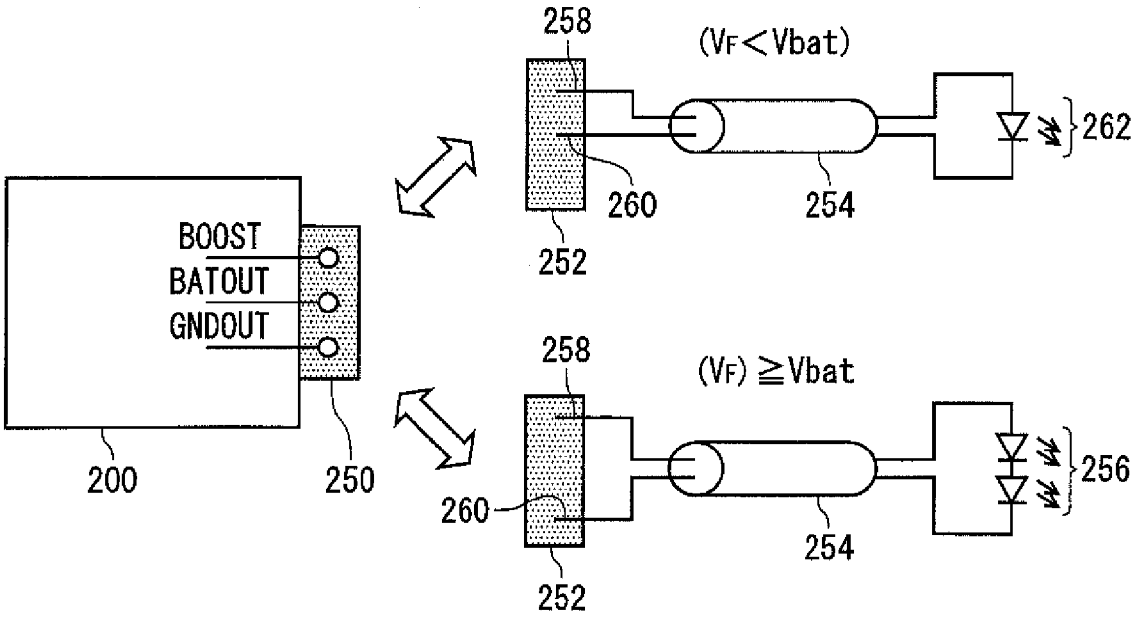
FIG. 3 is a schematic view showing a relationship between an LED-side connector and a three-terminal circuit-side connector of a semiconductor light source lighting circuit according to a second embodiment.

FIG. 3 is a schematic view showing a relationship between the LED-side connector 252 and the three-terminal circuit-side connector 250 of the semiconductor light source lighting circuit 200 according to the second embodiment. The three-terminal circuit-side connector 250 includes a boost voltage output terminal BOOST, a battery voltage output terminal BATOUT, and a ground potential output terminal GNDOUT. A boost voltage $V_{boost}$ generated by a DC/DC converter 6 is applied to the boost voltage output terminal BOOST, the battery voltage $V_{bat}$ is applied to the battery voltage output terminal BATOUT, and a ground potential is applied to the ground potential output terminal GNDOUT.

A module of an LED includes an LED-side connector 252 corresponding to the three-terminal circuit-side connector 250, LED-side cable harnesses 254, and an LED. The LED-side connector 252 includes an anode terminal 258 and a cathode terminal 260, and the anode terminal 258 and the cathode terminal 260 are connected to the anode and cathode of the LED through the LED-side cable harness 254, respectively.

The forward-drop voltage $V_F$ of the LED is known in the second embodiment.

When a forward-drop voltage $V_F$ of an LED 262 is lower than the battery voltage $V_{bat}$, the LED-side connector 252 is formed so that the boost voltage output terminal BOOST and the anode terminal 258 correspond to each other and the battery voltage output terminal BATOUT and the cathode terminal 260 correspond to each other. Accordingly, when the three-terminal circuit-side connector 250 is engaged with the LED-side connector 252, the boost voltage output terminal BOOST is connected to an anode of the LED 262 and the battery voltage output terminal BATOUT is connected to a cathode of the LED 262.

When a forward-drop voltage $V_F$ of an LED 256 is equal to or higher than the battery voltage $V_{bat}$, the LED-side connector 252 is formed so that the boost voltage output terminal BOOST and the anode terminal 258 correspond to each other and the ground potential output terminal GNDOUT and the cathode terminal 260 correspond to each other. Accordingly, when the three-terminal circuit-side connector 250 is engaged with the LED-side connector 252, the boost voltage output terminal BOOST is connected to the anode of the LED 256 and the ground potential output terminal GNDOUT is connected to the cathode of the LED 256.

The three-terminal circuit-side connector 250 may be a receptacle that includes, for example, three terminal pins and a housing including three slots in which the terminal pins are held. The LED-side connector 252 may be, for example, a plug that includes two terminal pins and a housing including three slots in which the terminal pins are held. Depending on the magnitude relationship between the forward-drop voltage $V_F$ and the battery voltage $V_{bat}$, it is decided in which two slots of the three slots of the housing of the plug the terminal pins are held.

Figure 4:
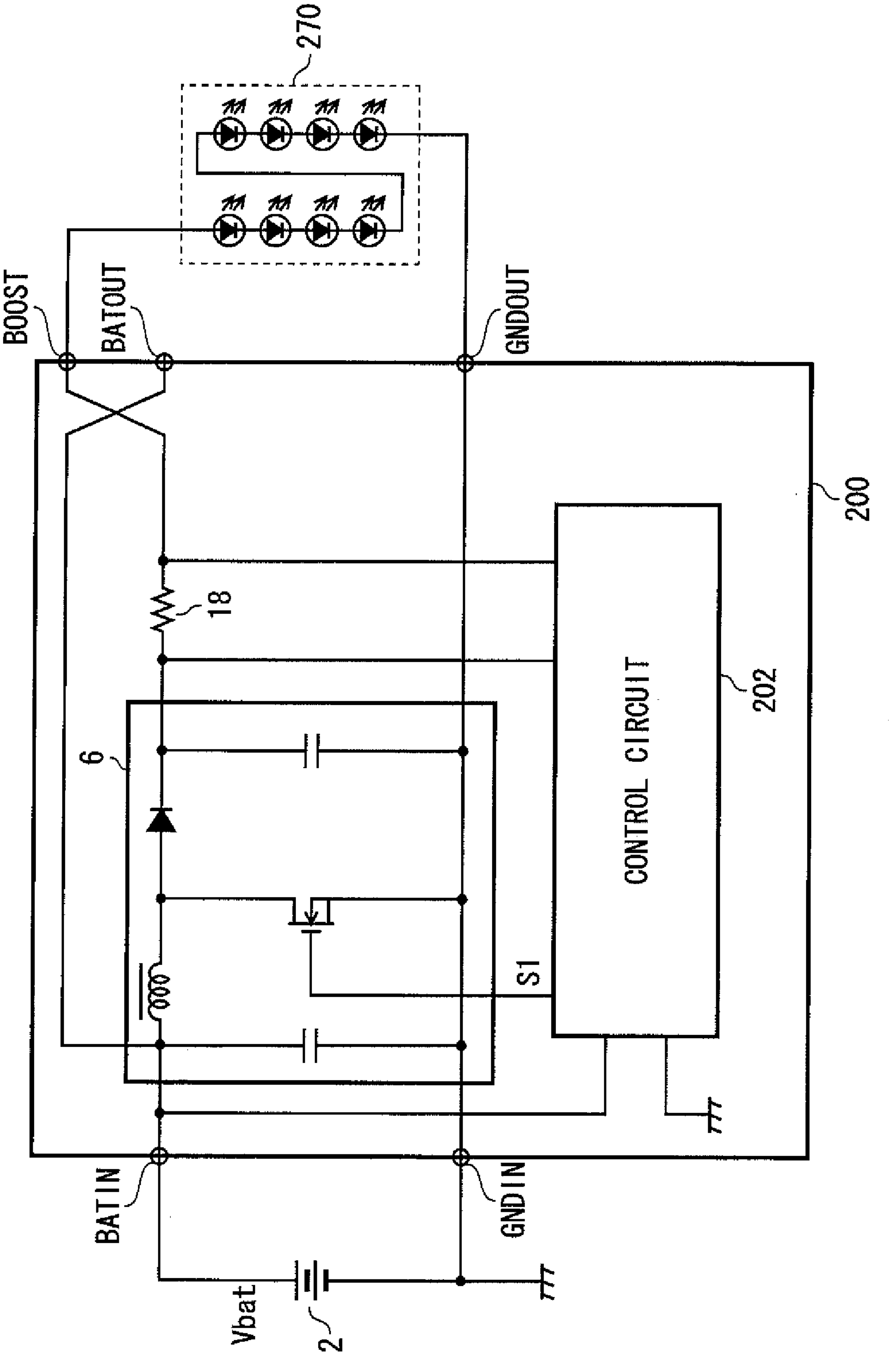
FIG. 4 is a circuit diagram showing the configuration of the semiconductor light source lighting circuit according to the second embodiment, and an in-vehicle battery and an LED connected to the light source lighting circuit.

FIG. 4 is a circuit diagram showing the configuration of the semiconductor light source lighting circuit 200 according to the second embodiment, and an in-vehicle battery 2 and an LED 270 connected to the light source lighting circuit 200. FIG. 4 shows an example in which a forward-drop voltage $V_F$ of the LED 270 is equal to or higher than the battery voltage $V_{bat}$, and the cathode side of the LED 270 is connected to the ground potential output terminal GNDOUT.

The semiconductor light source lighting circuit 200 corresponds to the semiconductor light source lighting circuit 100 according to the first embodiment from which an automatic switching function is excluded. The semiconductor light source lighting circuit 200 includes a DC/DC converter 6, a current detecting resistor 18, a control circuit 202, a battery voltage input terminal BATIN, a battery voltage output terminal BATOUT, a ground potential input terminal GNDIN, a ground potential output terminal GNDOUT, and a boost voltage output terminal BOOST. The control circuit 202 has the same current feedback function as the current feedback function of the control circuit 102 of the first embodiment.

According to the semiconductor light source lighting circuit 200 of this embodiment, the same advantages as described with respect to the semiconductor light source lighting circuit 100 according to the first embodiment can be obtained in terms of the sharing and electrical efficiency of a semiconductor light source lighting circuit.

(Third Embodiment)

The second embodiment described a situation in which the ground potential output terminal GNDOUT is connected to the cathode of the LED 256 when the forward drop voltage $V_F$ of the LED 256 is equal to or higher than the battery voltage $V_{bat}$. A semiconductor light source lighting circuit 300 according to a third embodiment switches a voltage, which is applied to a ground potential output terminal GNDOUT, to a battery voltage $V_{bat}$ from a ground potential and generates an interruption detection signal S6 if a predetermined short-circuit condition is satisfied when the ground potential output terminal GNDOUT is connected to the cathode of an LED.

The short-circuit may be, for example, a condition that an actual measured value of an electrical parameter is within a range of a value of the electrical parameter, a condition that an actual measured value of a forward-drop voltage $V_F$ of the LED is smaller than a known value, or a condition that the actual measured value of the forward-drop voltage $V_F$ of the LED is smaller than a predetermined short-circuit threshold value that is smaller than a known value and larger than the battery voltage $V_{bat}$, when a short-circuit occurs in the LED.

Figure 5:
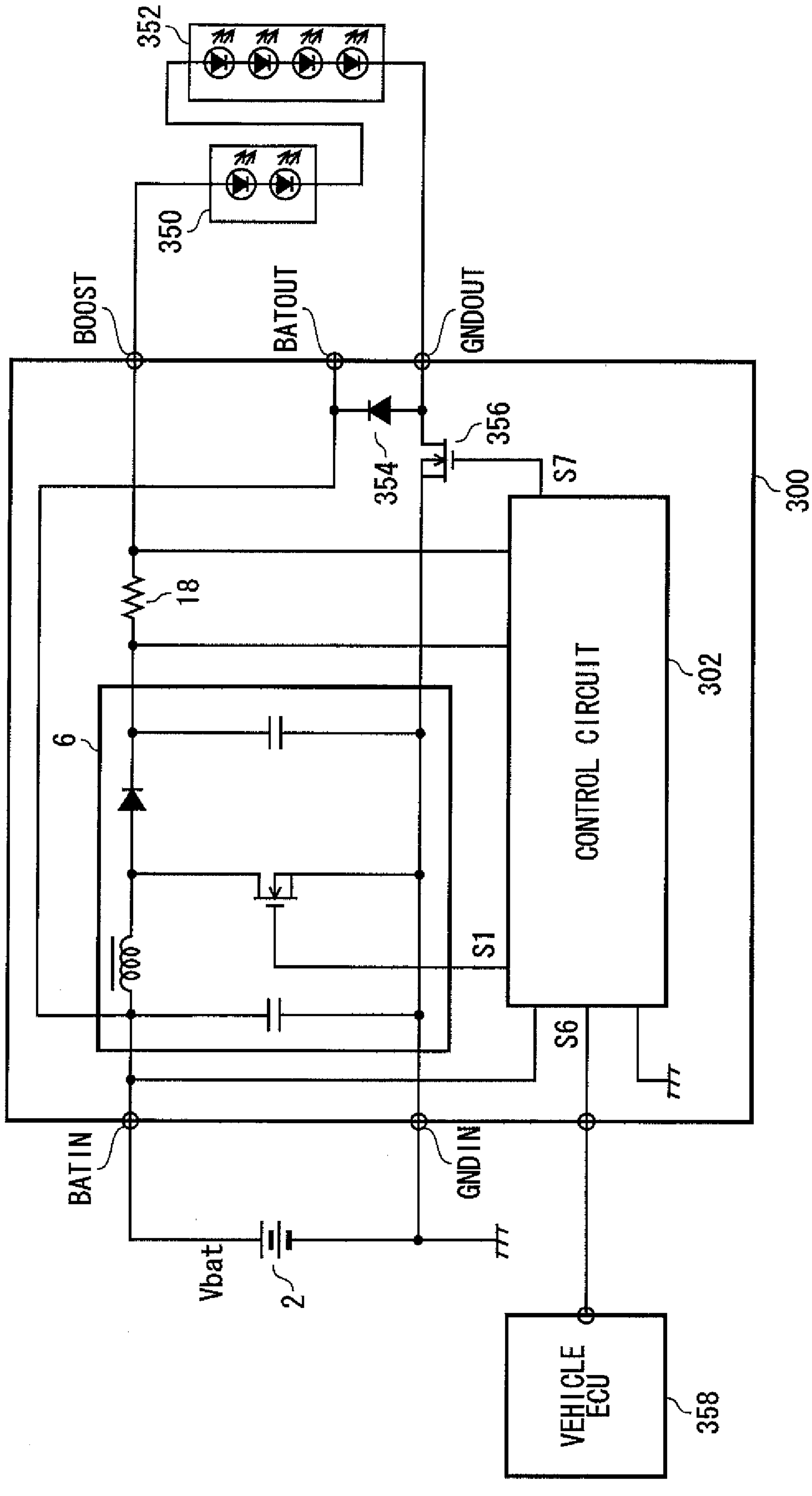
FIG. 5 is a circuit diagram showing the configuration of a semiconductor light source lighting circuit according to a third embodiment, and an in-vehicle battery, a first LED package, a second LED package, and a vehicle ECU (Engine Control Unit) connected to the light source lighting circuit.

FIG. 5 is a circuit diagram showing the configuration of a semiconductor light source lighting circuit 300 according to the third embodiment, and an in-vehicle battery 2, a first LED package 350, a second LED package 352, and a vehicle ECU 358 connected to the light source lighting circuit 300. FIG. 5 shows a case that a forward-drop voltage $V_F$ of both the first and second LED packages 350 and 352 is equal to or higher than the battery voltage $V_{bat}$. The anode side of the first LED package 350, which is a package including two LEDs connected in series, is connected to a boost voltage output terminal BOOST. The cathode side of the first LED package 350 is connected to the anode side of the second LED package 352, which includes four LEDs connected in series. The cathode side of the second LED package 352 is connected to the ground potential output terminal GNDOUT.

The semiconductor light source lighting circuit 300 includes a DC/DC converter 6, a current detecting resistor 18, a control circuit 302, a switching diode 354, a fourth switching element 356, a battery voltage input terminal BATIN, a battery voltage output terminal BATOUT, a ground potential input terminal GNDIN, a ground potential output terminal GNDOUT, and a boost voltage output terminal BOOST.

The anode of the switching diode 354 is connected to the ground potential output terminal GNDOUT, and the cathode of the switching diode 354 is connected to the battery voltage output terminal BATOUT.

The fourth switching element 356 is an N-channel MOSFET, and the drain of the fourth switching element 356 is connected to the anode of the switching diode 354 and the ground potential output terminal GNDOUT, and a source of the fourth switching element 356 is connected to the ground potential input terminal GNDIN. The fourth switching element 356 is controlled by a short-circuit switching signal S7 that is provided to its gate thereof from the control circuit 302.

The control circuit 302 has the same current feedback function as the current feedback function of the control circuit 102 of the first embodiment. The control circuit 302 monitors the forward-drop voltage $V_F$ of both the first and second LED packages 350 and 352. When the actual measured value of the forward-drop voltage $V_F$ is smaller than a short-circuit threshold value, the control circuit 302 selects the battery voltage $V_{bat}$ as a voltage, which is to be applied to the ground potential output terminal GNDOUT, and generates the interruption detection signal S6. In particular, when the actual measured value of the forward-drop voltage $V_F$ is smaller than the short-circuit threshold value, the control circuit 302 switches the fourth switching element 356 to a non-conducting state from a conducting state by converting the short-circuit switching signal S7 to a low level from a high level. Accordingly, a voltage, which is obtained by adding a forward-drop voltage of the switching diode 354 to the battery voltage $V_{bat}$, instead of a ground potential is applied to the ground potential output terminal GNDOUT.

The control circuit 302 sends the generated interruption detection signal S6 to an external vehicle ECU 358.

According to the semiconductor light source lighting circuit 300 of this embodiment, the same advantages as the advantages of the semiconductor light source lighting circuit 100 according to the first embodiment can be obtained in terms of the sharing and electrical efficiency of a semiconductor light source lighting circuit.

Further, when any one of the first and second LED packages 350 and 352 is short-circuited, there is a possibility that the forward-drop voltage $V_F$ of both the first and second LED packages 350 and 352 is lower than the battery voltage $V_{bat}$. Accordingly, in the semiconductor light source lighting circuit 300 according to this embodiment, a voltage applied to the ground potential output terminal GNDOUT is switched to the battery voltage $V_{bat}$ from a ground potential when such a short-circuit of the package is detected. For this reason, it is possible to maintain the lighting of the LED. Furthermore, the vehicle ECU 358 can perform appropriate processing in accordance with the interruption detection signal S6.

Various semiconductor light source lighting circuits have been described. These embodiments are illustrative, and it is understood by those skilled in the art that each of the components of the embodiments or the combination of the respective processing may have various modifications, and the modifications are also included in the scope of the invention. Moreover, the embodiments may be combined with each other. For example, the short-circuit detecting/switching function of the semiconductor light source lighting circuit 300 according to the third embodiment may be introduced into the semiconductor light source lighting circuit 100 according to the first embodiment.

A situation in which the boost voltage output terminal BOOST, the battery voltage output terminal BATOUT, and the ground potential output terminal GNDOUT form one three-terminal circuit-side connector was described in connection with the first embodiment, but the invention is not limited to such an arrangement. For example, new terminals, which are connected in the semiconductor light source lighting circuit, are provided at both the drains of the second and third switching elements 20 and 22 instead of the battery voltage output terminal BATOUT and the ground potential output terminal GNDOUT, and the new terminals and the boost voltage output terminal BOOST may form a two-terminal circuit-side connector.

In the first embodiment, the second switching element 20 may be substituted with a diode. In this case, the anode of the diode is connected to the battery voltage output terminal BATOUT, and the cathode of the diode is connected to the battery voltage input terminal BATIN. According to this modification, one switch of an object to be controlled is reduced as compared to the first embodiment. Accordingly, it is possible to simplify control. However, the electrical efficiency of the first embodiment may be better than that of this modification due to a forward-drop voltage of the diode.

A situation in which the battery voltage $V_{bat}$ is used as a threshold value of a forward-drop voltage of an LED used to select a voltage, which is to be applied to the cathode side of an LED of an object to be driven, was described in connection with the first to third embodiments, but the invention is not limited to such arrangements. For example, a voltage higher than the battery voltage $V_{bat}$ may be used as the threshold value.

A situation in which the positive boost voltage $V_{boost}$ is generated to drive the LED was described in the first to third embodiments, but the invention is not limited to such arrangements. The technical idea of the first, second, or third embodiment also may be applied to a situation in which a negative boost voltage is generated to drive the LED.

While aspects of embodiments of the present invention have been shown and described above, other implementations are within the scope of the claims. It will be understood by those skilled in the art that various changes in form and details may be made therein without departing from the spirit and scope of the invention as defined by the appended claims.

What is claimed is:

1. A lighting circuit for lighting a semiconductor light source, the circuit comprising:

a DC/DC converter configured to receive a DC first voltage and a DC second voltage different from the first voltage and generate a DC third voltage such that a difference between the third and second voltages is more than a difference between the first and second voltages;

a first connector comprising a first terminal, wherein the third voltage is applied to the first terminal, wherein the first connector is configured to connect the first terminal and one end of the semiconductor light source; and a control circuit configured to control the DC/DC converter such that a value of current flowing between the DC/DC converter and the first terminal is set to a certain value, wherein the control circuit is configured to select only the first voltage as a voltage applied to the other end of the semiconductor light source, when a light emission voltage for emitting the semiconductor light source is less than an absolute value of the difference between the first and second voltages, and wherein the control circuit is configured to select the first voltage or the second voltage as the voltage applied to the other end of the semiconductor light source, when the light emission voltage is not less than the absolute value.

2. The circuit according to claim 1, wherein the control circuit is configured to select the first voltage for a certain period, and after the certain period has elapsed, the control circuit is configured to select the first voltage or the second voltage as the voltage applied to the other end of the semiconductor light source, and the control circuit is configured to maintain a state where the first voltage or the second voltage is applied to the other end of the semiconductor light source.

3. A lighting circuit for lighting a semiconductor source, the circuit comprising:

a DC/DC converter configured to receive a DC first voltage and a DC second voltage different from the first voltage and generate a DC third voltage such that a difference between the third and second voltages is more than a difference between the first and second voltages;

a first connector comprising:

a first terminal, wherein the first voltage is applied to the first terminal;

a second terminal, wherein the second voltage is applied to the second terminal; and a third terminal, wherein the third voltage is applied to the third terminal, wherein the first connector is configured to connect the first terminal and one end of the semiconductor light source, a control circuit configured to control the DC/DC converter such that a value of current flowing between the DC/DC converter and the third terminal is set to a certain value, wherein only the first terminal is electrically connected to the other end of the semiconductor light source when a light emission voltage for emitting the semiconductor light source is less than an absolute value of a difference between the first and second voltages, and wherein the second terminal or the first terminal is electrically connected to the other end of the semiconductor light source when the light emission voltage is not less than the absolute value.

4. The circuit according to claim 3, wherein the control circuit is configured to select the first voltage as a voltage applied to the second terminal and generate a detection signal, when the second terminal is connected to the other end of the semiconductor light source and an actual measured value of the light emission voltage is less than a known value of the light emission voltage.

* * * * *